United States Patent
Vera (10) Patent No.: US 8,288,731 B2
(45) Date of Patent: Oct. 16, 2012

(54) SYSTEMS, METHODS AND APPARATUS FOR ADAPTIVE CORRECTION OF A FLAT PANEL DIGITAL X-RAY DETECTOR

(75) Inventor: German Guillermo Vera, Menomonee Falls, WI (US)

(73) Assignee: General Electric Company, Schenectady, NY (US)

( * ) Notice: Subject to any disclaimer, the term of this patent is extended or adjusted under 35 U.S.C. 154(b) by 1064 days.

(21) Appl. No.: 11/758,794

(22) Filed: Jun. 6, 2007

(65) Prior Publication Data

US 2011/0098961 A1    Apr. 28, 2011

(51) Int. Cl.
*G01T 1/24* (2006.01)
*G01T 1/20* (2006.01)

(52) U.S. Cl. .............................. 250/370.09; 250/370.11

(58) Field of Classification Search ............. 250/370.09, 250/371
See application file for complete search history.

(56) References Cited

U.S. PATENT DOCUMENTS

| 6,266,391 | B1 | 7/2001 | Albagli |
| 6,400,798 | B1 | 6/2002 | Leparmentier et al. |
| 7,352,840 | B1 * | 4/2008 | Nagarkar et al. ............... 378/19 |
| 7,615,754 | B2 * | 11/2009 | Liu et al. .................. 250/370.09 |
| 2007/0057699 | A1 * | 3/2007 | Tumer et al. ..................... 327/70 |
| 2007/0165617 | A1 * | 7/2007 | Spahn ........................... 370/357 |

\* cited by examiner

*Primary Examiner* — David Porta
*Assistant Examiner* — Mindy Vu
(74) *Attorney, Agent, or Firm* — Willima Baxter, Esq.; Michael G. Smith, Esq.

(57) ABSTRACT

Systems, methods and apparatus are provided through which in some embodiments indiscriminate correction of unintended charge in a digital X-ray detector is reduced by analyzing an unintended charge of a digital X-ray detector; and determining a significance of the unintended charge.

20 Claims, 6 Drawing Sheets

SYSTEMS, METHODS AND APPARATUS FOR ADAPTIVE CORRECTION OF A FLAT PANEL DIGITAL X-RAY DETECTOR

FIELD OF THE INVENTION

This invention relates generally to medical diagnostic imaging systems, and more particularly to correcting image artifacts induced by non-ideal effects in medical imaging systems employing solid state detectors.

BACKGROUND OF THE INVENTION

X-ray imaging has long been an accepted medical diagnostic tool. X-ray imaging systems are commonly used to capture, as examples, thoracic, cervical, spinal, cranial, and abdominal images that often include information necessary for a doctor to make an accurate diagnosis. X-ray imaging systems typically include an X-ray source and an X-ray sensor. When having a thoracic X-ray image taken, for example, a patient stands with his or her chest against the X-ray sensor as an X-ray technologist positions the X-ray sensor and the X-ray source at an appropriate height. X-rays produced by the source travel through the patient's chest, and the X-ray sensor then detects the X-ray energy generated by the source and attenuated to various degrees by different parts of the body. An associated control system obtains the detected X-ray energy from the X-ray sensor and prepares a corresponding diagnostic image on a display.

The X-ray sensor may be a conventional screen/film configuration, in which the screen converts the X-rays to light that exposes the film. The X-ray sensor may also be a solid state digital image detector. Digital detectors afford a significantly greater dynamic range than conventional screen/film configurations, typically as much as two to three times greater.

One embodiment of a solid state digital X-ray detector may be comprised of a panel or array of semiconductor field-effect transistors (FETs) and photodiodes. The FETs and photodiodes in the panel are typically arranged in rows (scan lines) and columns (data lines). A FET controller controls the order in which the FETs are turned on and off. The FETs are typically turned on, or activated, in rows. When the FETs are turned on, charge to establish the FET channel is drawn into the FET from both the source and the drain of the transistor. The source of each FET is connected to a photodiode. The drain of each FET is connected to readout electronics via data lines. Each photodiode integrates the light signal and discharges energy in proportion to the X-rays absorbed by the detector. The gates of the FETs are connected to the FET controller. The FET controller allows signals discharged from the panel of photodiodes to be read in an orderly fashion. The readout electronics convert the signals discharged from photodiodes. The energy discharged by the photodiodes in the detector and converted by the readout electronics is used by an acquisition system to activate pixels in the displayed digital diagnostic image. The panel of FETs and photodiodes is typically scanned by row. The corresponding pixels in the digital diagnostic image are typically activated in rows.

The FETs in the X-ray detector act as switches to control the charging and discharging of the photodiodes. When a FET is open, an associated photodiode is isolated from the readout electronics and is discharged during an X-ray exposure. When the FET is closed, the photodiode is recharged to an initial charge by the readout electronics. Light is emitted by a scintillator in response to X-rays absorbed from the source. The photodiodes sense the emitted light and are partially discharged. Thus, while the FETs are open, the photodiodes retain a charge representative of the X-ray dose. When a FET is closed, a desired voltage across the photodiode is restored. The measured charge amount to re-establish the desired voltage becomes a measure of the X-ray dose integrated by the photodiode during the length of the X-ray exposure.

X-ray images may be used for many purposes. For instance, internal defects in a target object may be detected. Additionally, changes in internal structure or alignment may be determined. Furthermore, the image may show the presence or absence of objects in the target. The information gained from X-ray imaging has applications in many fields, including medicine and manufacturing.

In any imaging system, X-ray or otherwise, image quality is of primary importance. In this regard, X-ray imaging systems that use digital or solid state image detectors ("digital X-ray systems") face certain unique difficulties. Difficulties in a digital X-ray image could include image artifacts, "ghost images," or distortions in the digital X-ray image. One source of difficulty faced by digital X-ray systems is the non-ideal characteristics of semiconductor devices used in the digital X-ray systems.

Ideally, FET switches isolate the photodiode from the electronics which restore the charge to and measure the charge upon the photodiode. In reality, FETs do not completely isolate the photodiode from the system, when the FETs are open. Consequently, under certain circumstances the FETs transfer excess charge to the readout electronics. The unintended charge leakage through the FETs may produce artifacts. Another source of difficulties is unintended charge generated in the panel as a result of electromagnetic fields generated from external sources.

FETs and other materials made of amorphous silicon also exhibit a characteristic referred to as charge retention. Charge retention is a structured phenomenon and may be controlled to a certain extent. Charge retention corresponds to the phenomenon whereby not all of the charge drawn into the FET to establish a conducting channel is forced out when the FET is turned off. The retained charge leaks out of the FET over time, even after the FET is turned off, and the leaked charge from the FET adds an offset to the signal read out of the photodiodes by the X-ray control system.

The FETs in the X-ray detector exhibit charge retention characteristics when voltage is applied to the gates of the FETs to read the rows of the X-ray detector. The detector rows are generally read in a predetermined manner, sequence, and time interval. The time interval may vary between read operations for complete frames of the X-ray image. When a FET is opened after the charge on an associated photodiode is read by a charge measurement unit, the FET retains a portion of the charge. Between read operations, the charge retained by the FETs leaks from the FETs to a charge measurement unit. The amount of charge that leaks from the FETs exponentially decays over time. The next read operation occurs before the entire retention charge leaks from the FETs. Consequently, the charge measurement unit measures during each read operation an amount of charge that was stored by the FETs during the previous read operation. The charge measurement unit also reads an amount of charge that was stored by FETs that were activated in scan lines preceding the current scan line in the current read operation.

The charge remaining on the FETs when a new read operation is initiated is referred to as the initial charge retention. The initial charge retention stored on multiple FETs, such as the FETs of a single data line, combines to form a charge retention offset for that column. The charge retention offset varies based on the rate at which rows of the X-ray detector panel are read. As the interval increases between read operations, the charge decay increases. As the panel rows are read, the charge retention offset builds to a steady state value. The steady state value for the charge retention rate represents the point at which the panel rows are read at a rate equaling the exponential decay rate of the charge on the FETs.

If the times between frames for both the offset and X-ray image are consistent, the effect of charge retention may be eliminated from the final image. In the normal process of reading a detector, the effect of retained charge may be minimized by simply subtracting the results of a "dark" scan from the results of an "exposed" scan. A "dark" scan is a reading done without X-ray. A "dark" scan simply activates the FETs on the X-ray detector panel. Thus, a "dark" scan may determine the charge retention characteristics exhibited by the FETs activated to read the X-ray detector. By subtracting the "dark" scan from the actual "exposed" scan of a desired object, the charge retention effects may be eliminated.

During an X-ray exposure, a similar phenomenon occurs whereby charge is generated in the FET. When the FETs are turned off at the end of the exposure, the additional charge also leaks out and adds to the read signal in a manner analogous to charge retention. However, the additional charge cannot be removed because the additional charge relates to the X-rays bombarding the X-ray detector. Thus, the additional charge is not predictable or nor is it reproducible in a "dark" image where no X-rays are transmitted. The number of FETs affected and the amount of charge conducted by the FETs are dependent upon the amount of X-ray exposure and the object imaged, as well as upon the individual properties of each FET. Since a solid state X-ray detector is structured along rows (scan lines) and columns (data lines), the excess charge in the FETs may result in structured image artifacts or offsets which cannot be corrected by contrasting the "exposed" image with a "dark" image.

Fortunately, correction mechanisms can be used to remove the artifacts caused by unintended charge. However, the correction of the unintended charge can have the effect of increasing the time to read an image and can also ironically have the counterproductive effect of adding noise to the image. Often, the benefits of the correction outweigh the detriments. However, it is desirable to only apply the correction when it is warranted. The correction for unintended charge may occur in addition to normal offset correction.

For the reasons stated above, and for other reasons stated below which will become apparent to those skilled in the art upon reading and understanding the present specification, there is a need in the art to reduce indiscriminate correction of unintended charge from a digital X-ray detector, thereby reducing the number of images with increased noise and read time by the digital X-ray detector.

BRIEF DESCRIPTION OF THE INVENTION

The above-mentioned shortcomings, disadvantages and problems are addressed herein, which will be understood by reading and studying the following specification.

In one aspect, the application or invocation of an artifact correction process to an image obtained from a digital X-ray detector is determined based on criteria that reduces indiscriminate application of the artifact correction process, which maintains the quality of images that do not require the correction, while improving the quality of images that do require it, and only increases the image read time of the images that need the correction.

In another aspect, image data is captured from a digital X-ray detector without reading the X-ray data stored on the panel of the digital X-ray detector. In some embodiments this reading is accomplished by de-energizing the scan line of the panel and performing a data line read operation. Thereafter, the data line signal is read a predetermined number of times and the result is stored. Thereafter, the data line signal is processed to determine the magnitude of an in the image artifact (eg: FET leakage charge). If the magnitude of the artifact is significant as determined from a pre-stored threshold or a model-based rule, then the digital X-ray detector is read in a manner that includes interspersed scan-on and scan-off reads, otherwise, a standard image read operation is performed on the digital X-ray detector.

The previous method ensures that only images with an artifact are corrected, and there is no degradation of image quality or system performance for images that do not have artifacts.

In yet another aspect, image data is captured from a digital X-ray detector without reading the X-ray data stored on the panel of the digital X-ray detector, such as by de-energizing the scan line of the panel and performing a data line read operation. Thereafter, the data line signal is read a predetermined number of times and the result is stored and transmitted to a host when a communication path to the host is operable. Then the digital X-ray detector is read in a manner that includes interspersed scan-on and scan-off reads, and this data is also transmitted to a host. In this aspect, the host receives information to determine if the correction is needed, thus avoiding degradation in image quality for the images that are unnecessarily corrected.

Systems, clients, servers, methods, and computer-readable media of varying scope are described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

The detailed description is divided into four sections. In the first section, a system level overview is described. In the second section, embodiments of methods are described. In the third section, particular implementations are described. Finally, in the fourth section, a conclusion of the detailed description is provided.

System Level Overview

Figure 1:
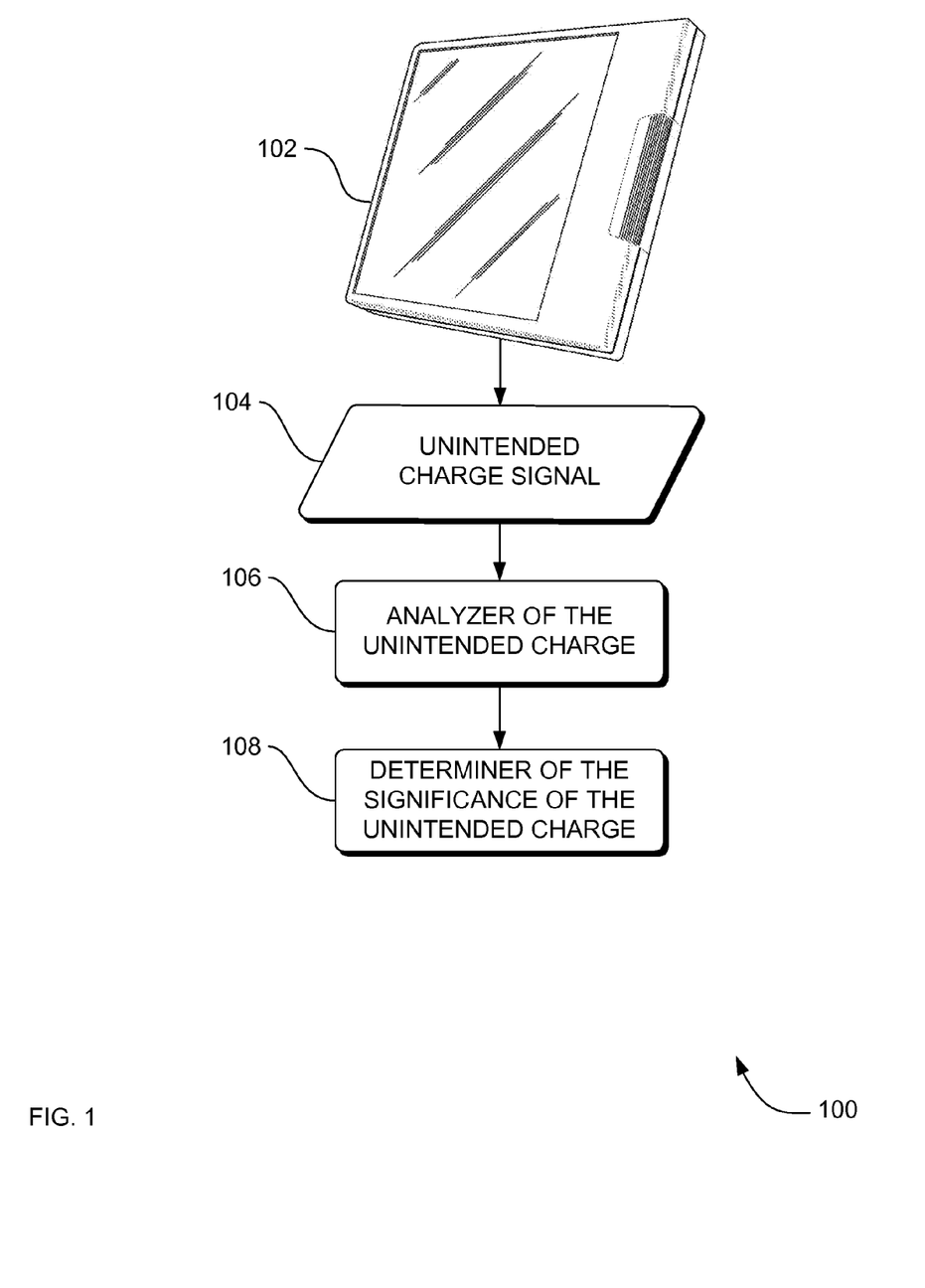
FIG. 1 is a block diagram of an overview of a system to reduce indiscriminate correction of unintended charge from a digital X-ray detector.

FIG. 1 is a block diagram of an overview of a system 100 to reduce indiscriminate correction of unintended charge from a digital X-ray detector. System 100 provides a mechanism to correct only those images that need to be corrected, thus avoiding negative impacts on noise and read time on images that do not need the correction.

System 100 includes a digital X-ray detector 102. The digital X-ray detector 102 generates an unintended charge signal 104. The unintended charge signal 104 is transmitted to an analyzer 106 of the unintended charge. The analyzer 106 of the unintended charge is described in greater detail in action 204 in FIG. 2 below. The analyzer 106 of the unintended charge is operably coupled to a determiner 108 of the significance of the unintended charge. The determiner 108 provides a basis to discriminate correction of the unintended charge of the signal 104 from the digital X-ray detector 102, thereby reducing unnecessary correction that adds noise to the images read by the digital X-ray detector 102.

While the system 100 is not limited to any particular digital X-ray detector 102, unintended charge signal 104, analyzer 106, and determiner 108 of the significance of the unintended charge, but for sake of clarity a simplified digital X-ray detector 102, unintended charge signal 104, analyzer 106 and determiner 108 of the significance of the unintended charge are described. While system 100 shows the analyzer 106 and the determiner 108 located outside the digital X-ray detector 102, system 100 is not necessarily limited according to an embodiment. Other embodiments include the analyzer 106 in the determiner 108 being located within the digital X-ray detector 102.

The system level overview of the operation of an embodiment is described above in this section of the detailed description. Some embodiments operate in a multi-processing, multi-threaded operating environment on a computer.

Method Embodiments

In the previous section, a system level overview of the operation of an embodiment is described. In this section, the particular methods of such an embodiment are described by reference to a series of flowcharts. Describing the methods by reference to a flowchart enables one skilled in the art to develop such programs, firmware, or hardware, including such instructions to carry out the methods on suitable computers, executing the instructions from computer-readable media. Similarly, the methods performed by the computer programs, firmware, or hardware are also composed of computer-executable instructions. Methods 200-600 are performed by a program executing on a proccessor, or performed by firmware or hardware. Methods 200-600 can be performed either by an embedded microprocessor in a digital X-ray detector or by a microprocessor in an imaging workstation, as described in greater detail below.

Figure 2:
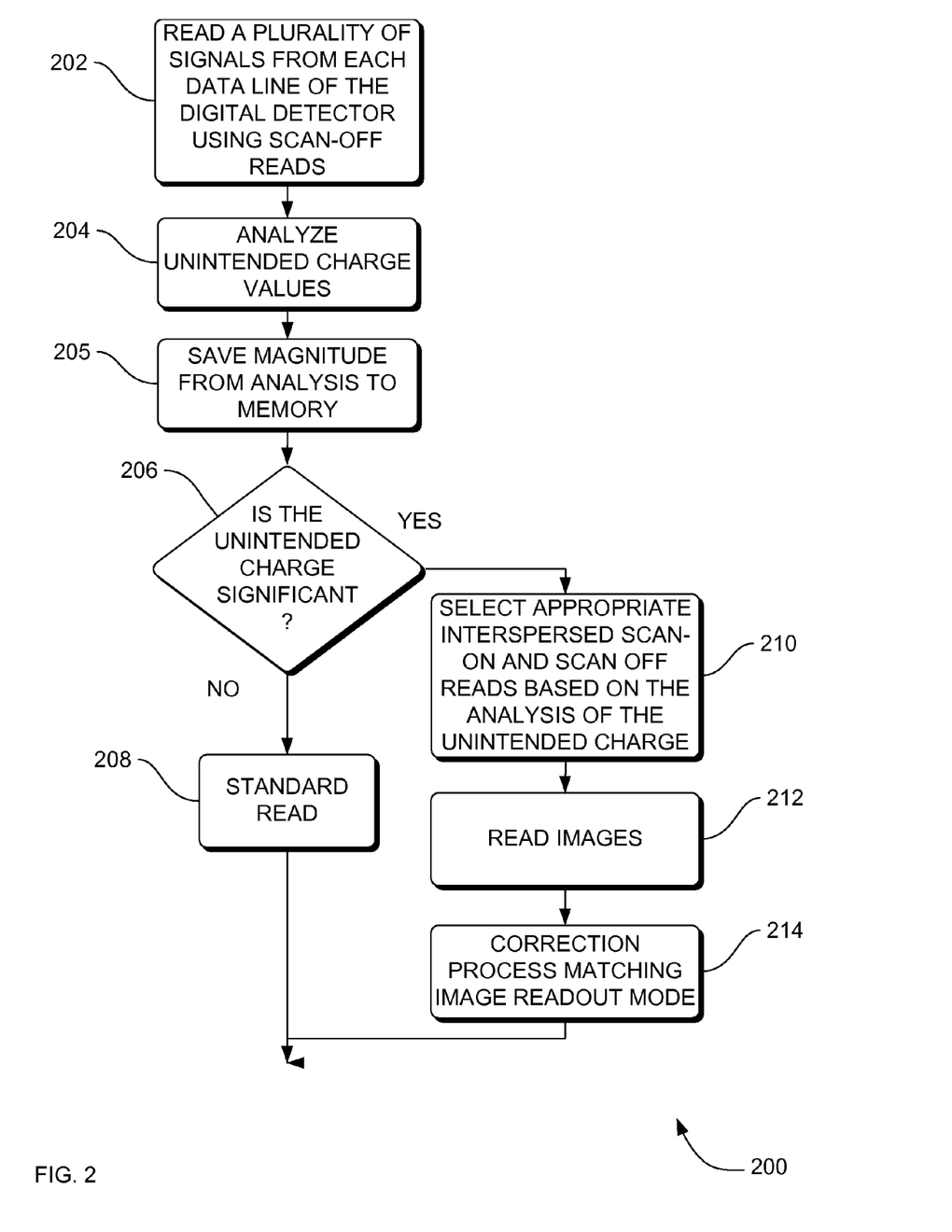
FIG. 2 is a flowchart of a method to accurately identify and correct an image having an artifact due to an unintended charge of a digital X-ray detector, according to an embodiment.

FIG. 2 is a flowchart of a method 200 to accurately identify and correct an image having an artifact due to an unintended charge of a digital X-ray detector, according to an embodiment. Method 200 solves the need in the art to reduce indiscriminate correction of unintended charge from a digital X-ray detector when the image with X-ray exposure is acquired first. In method 200, an X-ray image is acquired first, which is typical in the case of single shot images.

Some embodiments of method 200 include reading 202 a plurality of signals from each data line of the digital X-ray detector 102 using scan-off reads. A scan-off read is a read of a dataline in the panel of the digital X-ray detector while the field-effect-transistors (FETs) of the digital X-ray detector are not powered on (e.g. while FETs are turned off).

Figure 5:
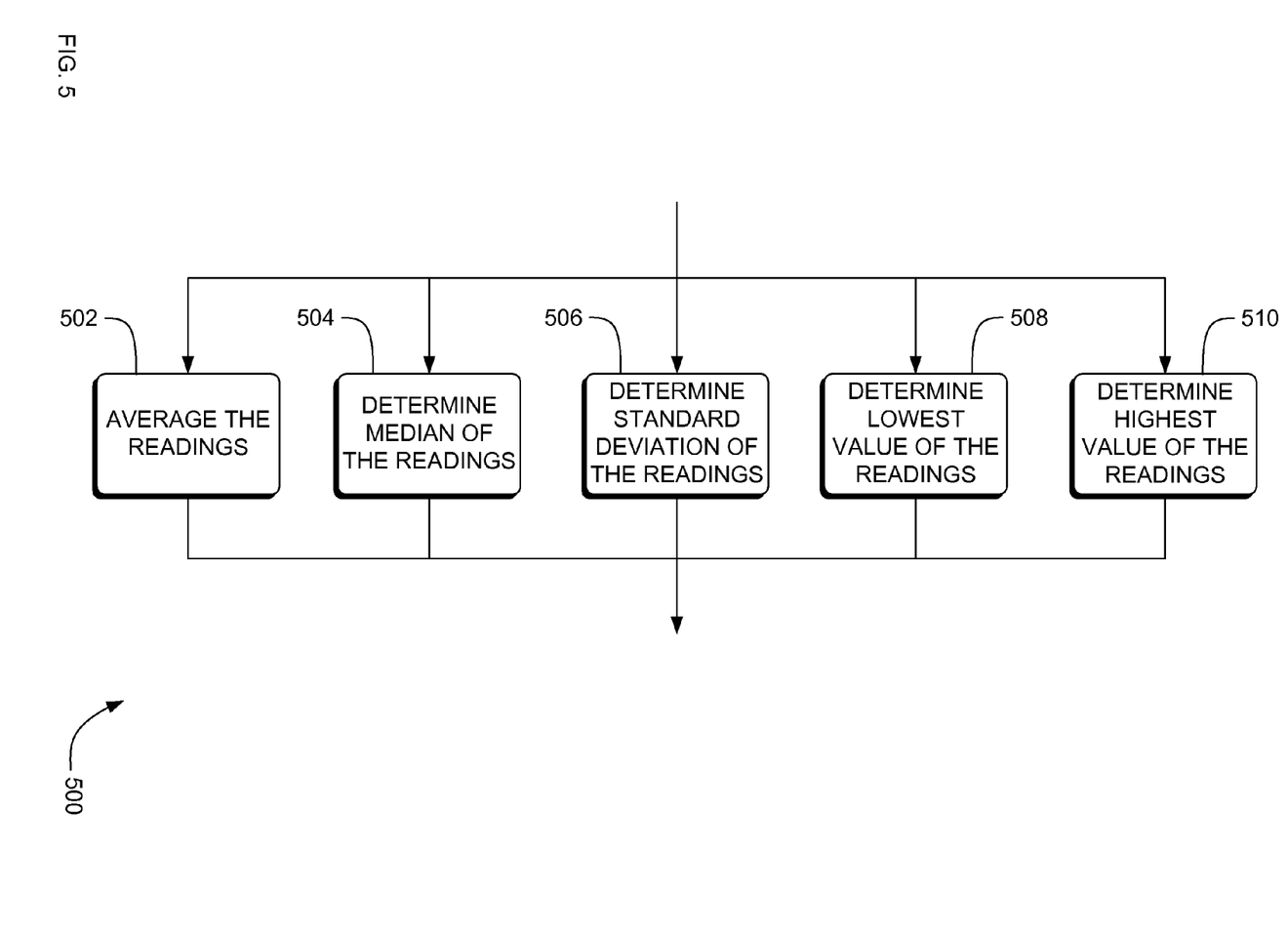
FIG. 5 is a flowchart of a method of analyzing unintended charge values, according to an embodiment.

Some embodiments of method 200 also include analyzing or assessing 204 the unintended charge values of the digital X-ray detector 102. In some embodiments, the unintended charge of individual datalines is analyzed. FIG. 5 below describes a number of specific embodiments of the analyzing 204. One example of the analyzing 204 is performed by the analyzer 106 of FIG. 1 above. In some embodiments, the analysis 204 of the unintended charge is based apriori on the operator/customer-selected application. For example, if an operator selects a high-dose application that can be expected to introduce artifacts, the analysis 204 is performed before image acquisition. Method 200 also includes saving 205 an indication or representation of a magnitude output from the analyzing 204.

Some embodiments of method 200 also include determining 206 whether or not, the unintended charge is significant. In some embodiments the determining 206 is performed by the determiner 108 in FIG. 1 above.

Some embodiments of method 200 also include performing a standard conventional read 208 of the digital X-ray detector 102 when the unintended charge is determined to be insignificant in action 206. When the unintended to charge is determined to be significant in action 206, some embodiments of method 200 also includes selecting and performing 210 an appropriate interspersed series of alternating scan-on and scan-off reads based on the analysis of the unintended charge from action 204. When the unintended to charge is determined to be significant in action 206, method 200 also includes reading 212 images. The images include an X-ray image and a dark image. Method 200 also includes correcting 214 the image data in a manner a corresponding to an image readout mode.

The analysis 204 provides a basis to discriminate in action 206 correction 214 of the unintended charge of the signal from the digital X-ray detector 102, thereby reducing unnecessary correction that adds noise to the images read by the digital X-ray detector 102.

Figure 3:
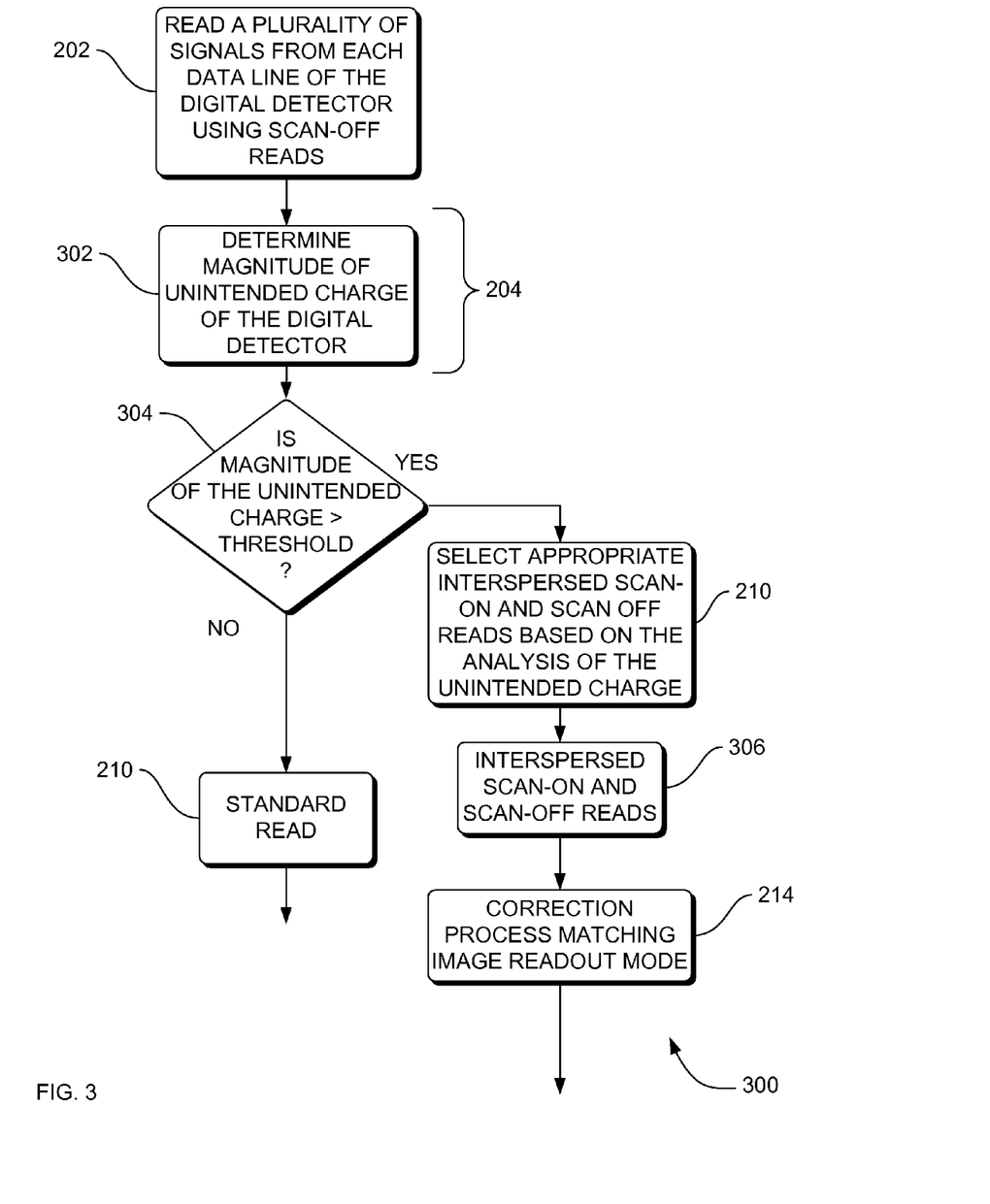
FIG. 3 is a flowchart of a method to accurately identify and correct an image having an artifact due to an unintended charge of a digital X-ray detector, according to an embodiment.

FIG. 3 is a flowchart of a method 300 to accurately identify and correct an image having an artifact due to an unintended charge of a digital X-ray detector, according to an embodiment. Method 300 solves the need in the art to reduce indiscriminate correction of unintended charge from a digital X-ray detector.

Some embodiments of method 300 include capturing data from the digital X-ray detector 102 without reading pixel data, such as reading 202 a plurality of signals from a data line of the digital X-ray detector 102 with scan-off. In one specific embodiment of reading 202, a signal is read from a data line of the digital X-ray detector 102, wherein the reading is performed two or more times, to the extent that a plurality of signals are read.

Some embodiments of method 300 also include determining 302 the magnitude of an unintended charge of the digital X-ray detector 102. In some embodiments of the determining 302, a magnitude of the unintended charge of the plurality of signals is determined. The determining 302 is one embodiment of the analyzing 204 in FIG. 2 above.

Some embodiments of method 300 also include determining 304 whether or not the magnitude of the unintended charge is greater than one or more thresholds. Some embodiments of determining 304 include comparing the magnitude to a pre-stored (e.g. predefined, or predetermined) set of thresholds.

Some embodiments of method 300 also include that when the magnitude of the unintended charge is not greater than the threshold(s), a standard conventional read 210 of the digital X-ray detector 102 is performed. Some embodiments of method 300 also include that when the magnitude of the unintended charge is greater than the threshold(s) as determined in action 304, selecting 210 an appropriate interspersed series of alternating scan-on and scan-off reads based on the analysis of the unintended charge from action 302 and performing 306 appropriate interspersed series of alternating scan-on and scan-off reads based on the analysis of the unintended charge from action 302. Action 306 is substantially similar to the selecting and performing in action 210 in FIG. 2 above. Examples of appropriate interspersed series of alternating scan-on and scan-off reads include "On/Off/On/Off," "On/Off/Off/On/Off/Off" and "On/On/Off/On/On/Off, etc."

Some embodiments of method 300 also include that when the magnitude of the unintended charge is greater than the threshold(s) as determined in action 304, method 300 also includes correcting 214 the image data in a manner corresponding to the interspersed scan-on and scan-off readout mode used.

Figure 4:
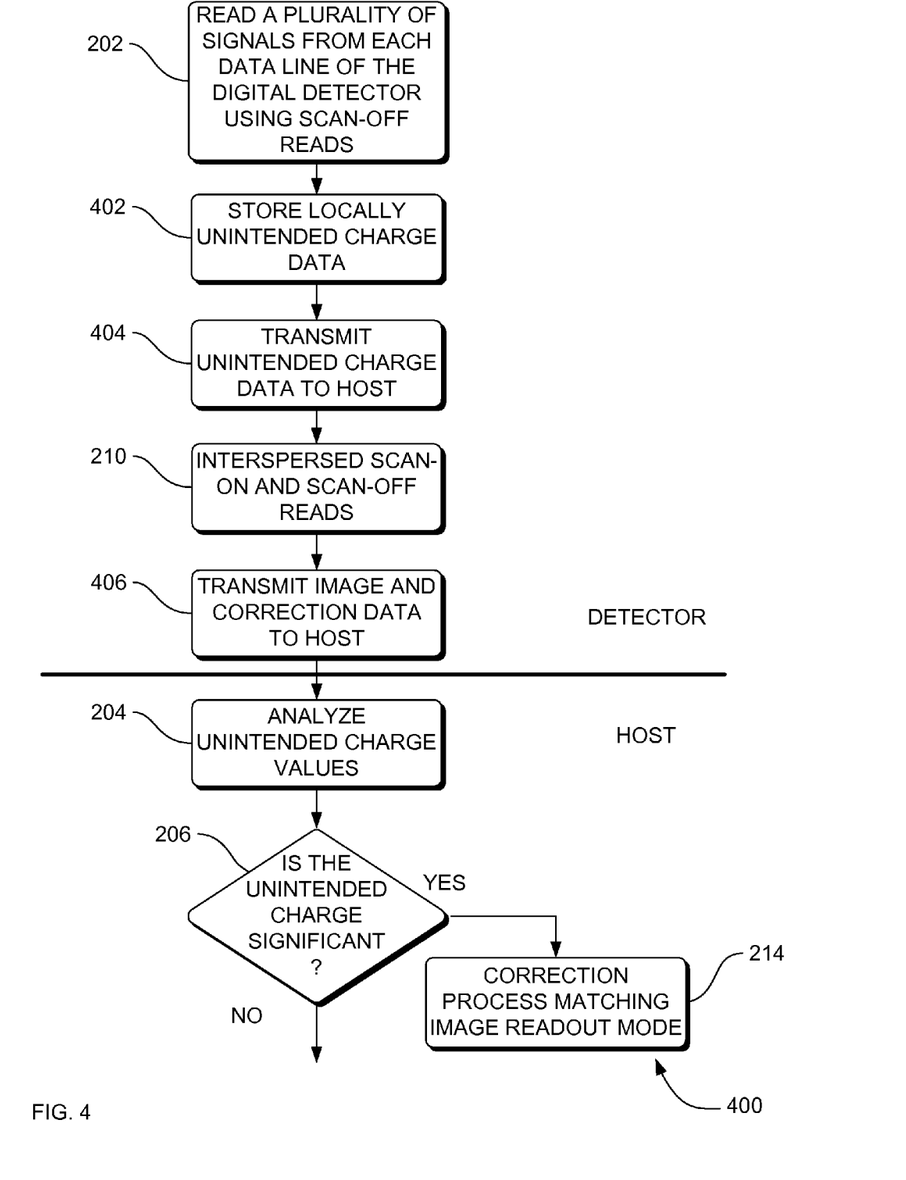
FIG. 4 is a flowchart of a method to accurately identify and correct an image having an artifact due to an unintended charge of a digital X-ray detector, according to an embodiment.

FIG. 4 is a flowchart of a method 400 to accurately identify and correct an image having an artifact due to an unintended charge of a digital X-ray detector, according to an embodiment. Method 400 solves the need in the art to reduce indiscriminate correction of unintended charge from a digital X-ray detector.

Some embodiments of method 200 include reading 202 a plurality of signals from each data line of the digital X-ray detector 102 using scan-off reads.

Some embodiments of method 200 also include storing 402 locally data that represents the unintended charge. Some embodiments of method 200 also include transmitting 404 the data that represents the unintended charge to a host.

Some embodiments of method 200 also include performing 210 an appropriate interspersed series of alternating scan-on and scan-off reads and transmitting 406 image and correction data to the host. In some embodiments of method 400, the reading 202, storing 402, transmitting 404, readings 210 and transmitting 406 are performed by a digital X-ray detector 102.

Some embodiments of method 200 also include analyzing 204 the unintended charge values provided by the digital X-ray detector 102. FIG. 5 below describes a number of specific embodiments of the analyzing 204. One example of the analyzing 204 is performed by the analyzer 106 of FIG. 1 above.

Some embodiments of method 200 also include determining 206 whether or not, the unintended charge is significant. In some embodiments the determining 206 is performed by the determiner 108 in FIG. 1.

Some embodiments of method 200 also include correcting 214 the image data in a manner a corresponding to an image readout mode when the unintended to charge is determined to be significant in action 206

The analysis 204 in method 400 provides a basis to discriminate in action 206 correction 214 of the unintended charge of the signal from the digital X-ray detector 102, thereby reducing unnecessary corrections that add noise to the images read by the digital X-ray detector 102.

FIG. 5 is a flowchart of a method 500 of analyzing unintended charge values, according to an embodiment. Method 500 shows a number of alternative embodiments of the analyzing 204 unintended charges in FIG. 2 above.

In method 500, the alternative embodiments are arithmetic operations performed on readings of the unintended charges. For example, one embodiment of the analyzing 204 of the unintended charge includes averaging 502 the readings. The averaging 502 can be spatial or temporal averaging. In another example, another embodiment of the analyzing 204 of the unintended charge includes determining the median value 504 of the readings. In yet another example, another embodiment of the analyzing 204 of the unintended charge includes determining the standard deviation 506 of the readings. In still another example, another embodiment of the analyzing 204 of the unintended charge includes determining the lowest value 508 of the readings. In still yet another example, another embodiment of the analyzing 204 of the unintended charge includes determining the highest value 510 of the readings. In yet a further example, the analyzing 204 of the unintended charge includes applying an infinite impulse response (IIR) filter of the readings (not shown). In still yet a further example, the analyzing 204 of the unintended charge includes applying a finite impulse response FIR filter of the readings (not shown). Any one of the actions in method 500 can be selected alone or in combination with other actions in method 500 to analyze 204 the unintended charge. In method 500, the result of actions 502, 504, 506, 508 and 510 describe the unintended charge.

Figure 6:
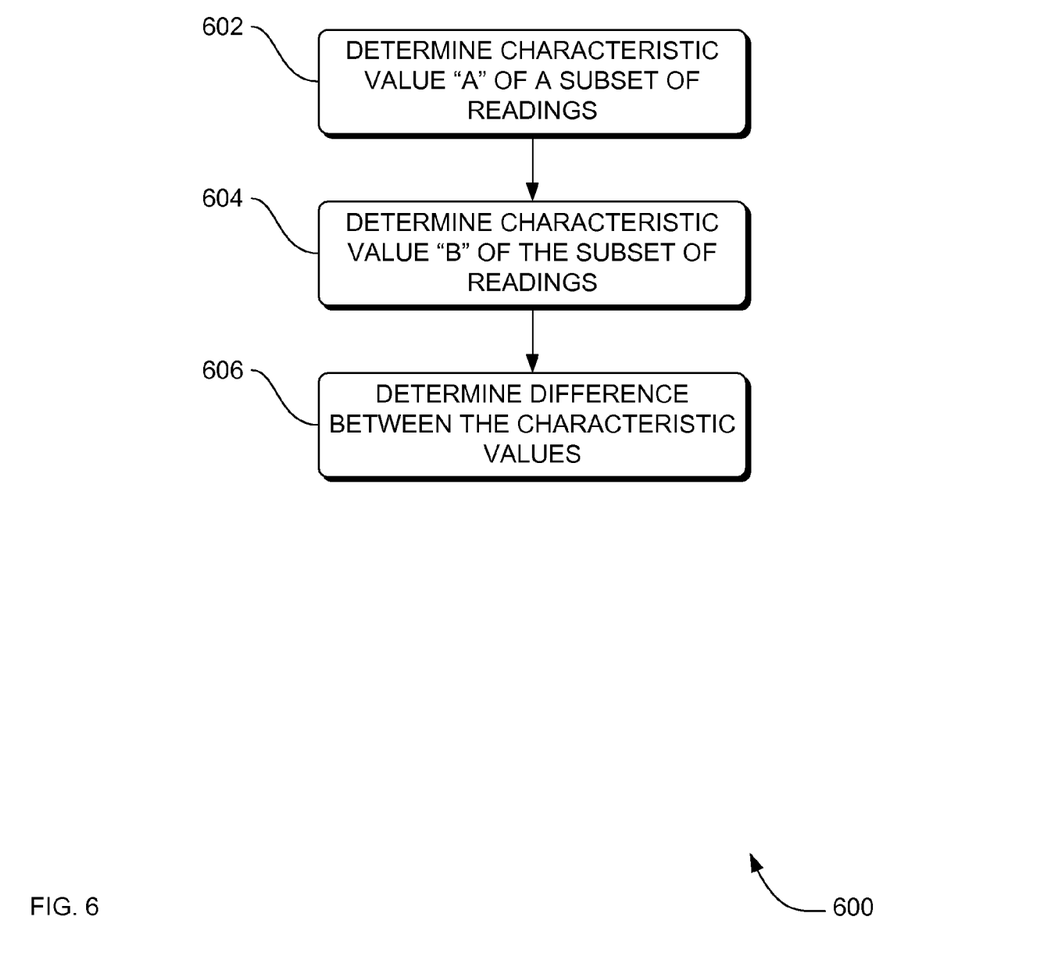
FIG. 6 is a flowchart of a method of analyzing unintended charge values, according to an embodiment.

FIG. 6 is a flowchart of a method 600 of analyzing unintended charge values, according to an embodiment. Method 600 is one embodiment of the analyzing 204 unintended charges in FIG. 2 above. Method 600 includes determining 602 a first characteristic value ("A") of a subset of readings from the digital X-ray detector. Method 600 includes determining 604 a second characteristic value ("B") of the subset of readings from the digital X-ray detector.

Thereafter method 600 includes determining 606 a difference or variance between the characteristic values "A" and "B" of the subset of readings determined in actions 602 and 604 above. In method 600 the variance or the difference represents the unintended charge.

In some embodiments, methods 200-600 are implemented as a computer data signal, that represents a sequence of instructions which, when executed by a processor, such as a processor, cause the processor to perform the respective method. In other embodiments, methods 200-600 are implemented as a computer-accessible medium having executable instructions capable of directing a processor to perform the respective method. In varying embodiments, the medium is a magnetic medium, an electronic medium, or an optical medium.

In some embodiments, methods 200-600 are implemented in the random-access memory (RAM) in an embedded microprocessor in the digital X-ray detector, the RAM having executable instructions capable of directing the processor to perform the respective method. The microprocessor can be commercially available from Intel, Motorola, Cyrix and others.

The following description provides an overview of another computer hardware and a embodiment in conjunction with which some embodiments can be implemented. Some embodiments are a computer executing computer-executable instructions. However, some embodiments are implemented entirely in computer hardware in which computer-executable instructions are implemented in read-only memory. Some embodiments can also be implemented in client/server computing environments where remote devices that perform tasks are linked through a communications network. Program modules can be located in both local and remote memory storage devices in a distributed computing environment.

A computer includes a processor, commercially available from Intel, Motorola, Cyrix and others. A computer also includes random-access memory (RAM), read-only memory (ROM), one or more mass storage devices, and a system bus, that operatively couples various system components to the processing unit. The memory and mass storage devices are types of computer-accessible media. Mass storage devices are more specifically types of nonvolatile computer-accessible media and can include one or more hard disk drives, floppy disk drives, optical disk drives, and tape cartridge drives. The processor executes computer programs stored on a computer-accessible media.

A computer can be communicatively connected to the Internet via a communication device. Internet connectivity is well known within the art. In one embodiment, a communication device is a modem that responds to communication drivers to connect to the Internet via what is known in the art as a "dial-up connection." In another embodiment, a communication device is an Ethernet® or similar hardware network card connected to a local-area network (LAN) that itself is connected to the Internet via what is known in the art as a "direct connection" (e.g., T1 line, etc.).

A user enters commands and information into a computer through input devices such as a keyboard or a pointing device. The keyboard permits entry of textual information into computer, as known within the art, and embodiments are not limited to any particular type of keyboard. Pointing device permits the control of the screen pointer provided by a graphical user interface (GUI) of operating systems such as versions of Microsoft Windows®. Embodiments are not limited to any particular pointing device. Such pointing devices include mice, touch pads, trackballs, remote controls and point sticks. Other input devices (not shown) can include a microphone, joystick, game pad, satellite dish, scanner, or the like.

In some embodiments, a computer is operatively coupled to a display device. The display device is connected to the system bus. Display device permits the display of information, including computer, video and other information, for viewing by a user of a computer. Embodiments are not limited to any particular display device. Such display devices include cathode ray tube (CRT) displays (monitors), as well as flat panel displays such as liquid crystal displays (LCD's). In addition to a monitor, computers typically include other peripheral input/output devices such as printers (not shown). Speakers and provide audio output of signals. The speakers are also connected to the system bus.

A computer also includes an operating system (not shown) that is stored on a computer-accessible media, the RAM, the ROM, and/or the mass storage device, and is executed by the processor. Examples of operating systems include Microsoft Windows®, Apple MacOS®, Linux®, UNIX®. Examples are not limited to any particular operating system, however, and the construction and use of such operating systems are well known within the art.

Embodiments of a computer are not limited to any type of computer. In varying embodiments, a computer comprises a PC-compatible computer, a MacOS®-compatible computer, a Linux®-compatible computer, or a UNIX®-compatible computer. The construction and operation of such computers are well known within the art.

A computer can be operated using at least one operating system to provide a graphical user interface (GUI) including a user-controllable pointer. A computer can have at least one web browser application program executing within at least one operating system, to permit users of a computer to access an intranet, extranet or Internet world-wide-web pages as addressed by Universal Resource Locator (URL) addresses. Examples of browser application programs include Netscape Navigator® and Microsoft Internet Explorer®.

A computer can operate in a networked environment using logical connections to one or more remote computers. These logical connections are achieved by a communication device coupled to, or a part of, a computer. Embodiments are not limited to a particular type of communications device. The remote computer can be another computer, a server, a router, a network PC, a client, a peer device or other common network node. The logical connections include a local-area network (LAN) and a wide-area network (WAN). Such networking environments are commonplace in offices, enterprise-wide computer networks, intranets, extranets and the Internet.

When used in a LAN-networking environment, a computer and remote computer are connected to the local network through network interfaces or adapters, which is one type of communications device. Remote computer also includes a network device. When used in a conventional WAN-networking environment, a computer and remote computer communicate with a WAN through modems (not shown). The modem, which can be internal or external, is connected to the system bus. In a networked environment, program modules depicted relative to a computer, or portions thereof, can be stored in the remote computer.

A computer also includes at least one power supply. Each power supply can be a battery.

Apparatus components that perform the actions of methods 200-600 can be embodied as computer hardware circuitry or as a computer-readable program, or a combination of both. More specifically, in a computer-readable program embodiment, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer, or on at least as many computers as there are components.

Conclusion

A digital X-ray image artifact analyzer and corrector is described. A technical effect of the systems method and apparatus described herein is to more accurately determine and provide an indication as to when an unintended charge in the digital X-ray detector can be corrected in a manner to the extent that artifacts are reduced and the time to read an image is reduced. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations. For example, although described in procedural terms, one of ordinary skill in the art will appreciate that implementations can be made in an object-oriented design environment or any other design environment that provides the required relationships.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types.

The terminology used in this application is meant to include all digital X-ray detector, database and communication environments and alternate technologies which provide the same functionality as described herein.

I claim:

1. A method to reduce indiscriminate correction of unintended charge in a digital X-ray detector, the method comprising:
    analyzing an unintended charge of the digital X-ray detector;
    determining a significance of the unintended charge;
    determining a magnitude of an artifact in a graphical image obtained from the digital X-ray detector, wherein the artifact is a result of the unintended charge of the digital X-ray detector; and
    correcting image data when the unintended charge is significant.

2. The method of claim 1, wherein the correcting further comprises:
    correcting the image data in a manner corresponding to an image readout mode.

3. The method of claim 1, wherein the analyzing of the unintended charge further comprises:
    performing arithmetic operations on readings of the unintended charges of a data-line of the digital X-ray detector.

4. The method of claim 3, wherein the arithmetic operation further comprise:
    averaging a plurality of readings of a data-line of the digital X-ray detector.

5. The method of claim 3, wherein the arithmetic operation further comprise:
    determining a median of a plurality of readings of a data-line of the digital X-ray detector.

6. The method of claim 3, wherein the arithmetic operation further comprise:
    determining a standard deviation of a plurality of readings of a data-line of the digital X-ray detector.

7. The method of claim 3, wherein the arithmetic operation further comprise:
    determining a lowest value of a plurality of readings of a data-line of the digital X-ray detector.

8. The method of claim 3, wherein the arithmetic operation further comprises:
    determining a highest value of a plurality of readings of a data-line of the digital X-ray detector.

9. The method of claim 1, wherein the analyzing of the unintended charge further comprises:
    determining a first characteristic value of a subset of a plurality of readings of a data-line of the digital X-ray detector;
    determining a second characteristic value of the subset of the plurality of readings of a data-line of the digital X-ray detector; and
    determining a difference between the first characteristic value of the subset and the second characteristic value of the subset.

10. The method of claim 1, further comprising determining whether or not the magnitude of the artifact exceeds the significance by comparing the magnitude to a pre-stored set of thresholds.

11. The method of claim 1 further comprising:
    reading in a scan-on mode; and
    reading in a scan-off mode, interspersed with the reading in the scan-on mode.

12. The method of claim 1 further comprising:
    performing a conventional read operation on the digital X-ray detector.

13. A computer-accessible medium having executable instructions to discriminate between digital X-ray detector data that can be corrected and digital X-ray detector data to remain uncorrected, the executable instructions capable of directing a processor to perform:
    reading a signal from a data-line of a digital X-ray detector, the reading being performed a plurality of instances, yielding a plurality of signals;
    determining a magnitude of an unintended charge in the plurality of signals;
    determining a magnitude of an artifact in a graphical image obtained from the digital X-ray detector, wherein the artifact is a result of the unintended charge of the digital X-ray detector; and
    correcting image data in a memory when the unintended charge has a sufficient magnitude.

14. The computer-accessible medium of claim 13, the medium further comprising executable instructions capable of directing the processor to perform:
    determining whether or not the magnitude of the unintended charge exceeds a particular significance.

15. The computer-accessible medium of claim 13, the medium further comprising executable instructions capable when the magnitude of the unintended charge exceeds a particular significance of directing the processor to perform:
    reading in a scan-on mode; and
    reading in a scan-off mode, interspersed with the reading in the scan-on mode.

16. The computer-accessible medium of claim 13, the medium further comprising executable instructions capable when the magnitude of the unintended charge does not exceed a particular significance of directing the processor to perform:
    performing a conventional read operation on the digital X-ray detector.

17. A system comprising:
    a processor;
    a storage device coupled to the processor and operable to store image data; and
    software apparatus operative on the processor operable to:
        determine a magnitude of an artifact in a graphical image obtained from a digital X-ray detector, wherein the artifact is a result of an unintended charge of the digital X-ray detector; and
        determine whether or not the magnitude of the artifact exceeds a particular threshold,
        correct image data when the magnitude exceeds the threshold,
        wherein the digital X-ray detector further comprises an array of field-effect-transistors and photodiodes.

18. The system of claim 17, wherein the software apparatus is further operable to:
    capture image data from the digital X-ray detector without reading pixel data from the digital X-ray detector; and read a plurality of signals from a data-line of the digital X-ray detector.

19. The system of claim 17, wherein the software apparatus is further operable to:
analyze the unintended charge of the array of field-effect-transistors of the digital X-ray detector.

20. The system of claim 17, wherein the software apparatus is further operable to:
read from the digital X-ray detector in a scan-on mode; and
read from the digital X-ray detector in a scan-off mode, interspersed with the reading in the scan-on mode.

* * * * *